US006993188B2

(12) United States Patent
Aoki

(10) Patent No.: US 6,993,188 B2
(45) Date of Patent: Jan. 31, 2006

(54) VIDEO INFORMATION PROCESSING APPARATUS AND TRANSMITTER FOR TRANSMITTING INFORMATION TO THE SAME

(75) Inventor: Hisashi Aoki, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 10/909,341

(22) Filed: Aug. 3, 2004

(65) Prior Publication Data

US 2005/0008226 A1 Jan. 13, 2005

Related U.S. Application Data

(62) Division of application No. 09/852,086, filed on May 10, 2001, now Pat. No. 6,853,750.

(30) Foreign Application Priority Data

May 12, 2000 (JP) .............................. 2000-139253

(51) Int. Cl.
*G06K 9/46* (2006.01)

(52) U.S. Cl. ....................... 382/190; 382/233; 382/306

(58) Field of Classification Search ............... 382/103, 382/151, 168, 173, 181, 190, 233, 236, 284, 382/291, 306; 345/629; 348/584, 586, 587

See application file for complete search history.

(56) References Cited

U.S. PATENT DOCUMENTS

| 5,036,385 A | 7/1991 | Eichenlaub ................... 348/59 |
| 5,611,038 A | 3/1997 | Shaw et al. .............. 715/500.1 |
| 5,793,630 A | 8/1998 | Theimer et al. .............. 700/11 |
| 6,389,182 B1 | 5/2002 | Ihara et al. .................. 382/309 |

FOREIGN PATENT DOCUMENTS

| JP | 08-234827 | 9/1996 |
| JP | 10-091791 | 4/1998 |
| JP | 2000-172961 | 6/2000 |
| JP | 2001-177819 | 6/2001 |

OTHER PUBLICATIONS

Darnell J. Moore, et al. "Implementing Phicons: Combining Computer Vision with InfraRed Technology for Interactive Physical Icons.", In Proceedings of ACM Symposium on User Interface Software and Technology, 1999, pp. 67-68.
Jun Rekimoto, et al. "CyberCode: Designing Augmented Reality Environments with Visual Tags", in Proceedings of Designing Augmented Reality Environments, 2000.

*Primary Examiner*—Daniel Miriam
(74) *Attorney, Agent, or Firm*—Oblon, Spivak, McClelland, Maier & Neustadt, P.C.

(57) ABSTRACT

A video information processing apparatus includes an input device which inputs video, a memory device which stores identification information corresponding to the blinking pattern of a blinking light source, a blinking light decoder which converts the blinking pattern of the light source blinking in the video information input by the input device into corresponding identification information on the basis of the identification information stored in the memory device, and an output device which outputs together with the input video the identification information converted by the blinking light decoder.

21 Claims, 9 Drawing Sheets

| BLINKING PATTERN | ID INFORMATION |
|---|---|
| [10010110] | [150] |
| ⋮ | ⋮ |
| [01001000011001010110110001101100001101111] | [Hello] |
| ⋮ | ⋮ |
FIG. 3
- (T) Kendall Station, Cambridge
- Food Court, Open Hours 8am-7pm
FIG. 4
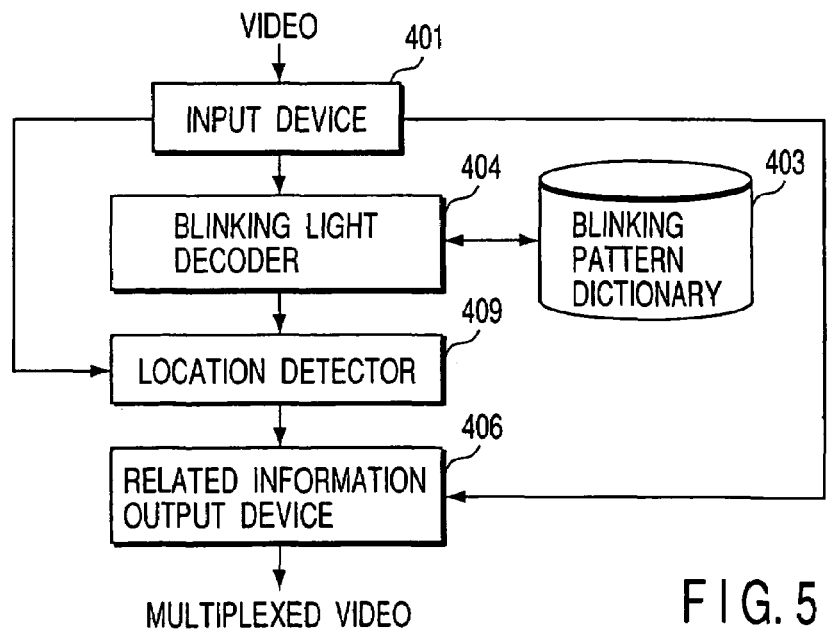
FIG. 5

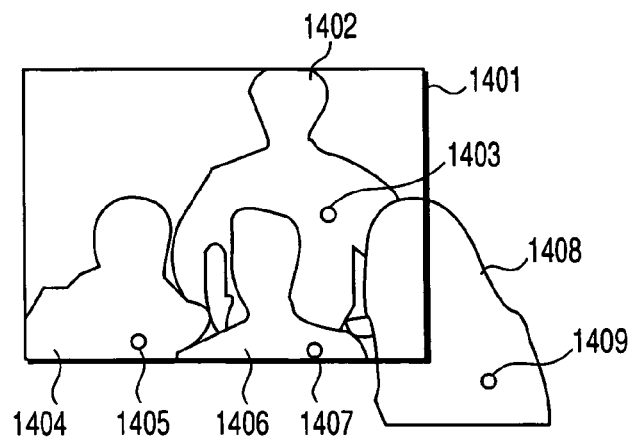
F I G. 16
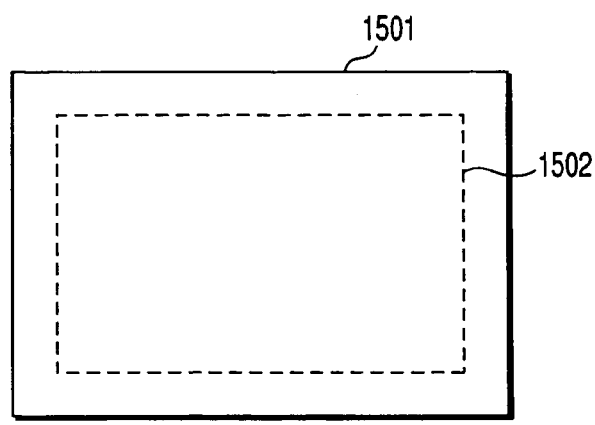
F I G. 17
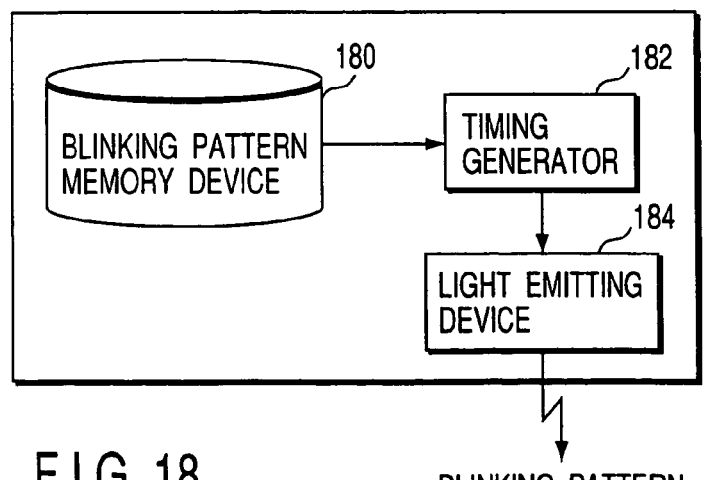
F I G. 18

VIDEO INFORMATION PROCESSING APPARATUS AND TRANSMITTER FOR TRANSMITTING INFORMATION TO THE SAME

CROSS-REFERENCE TO RELATED APPLICATIONS

This application is a divisional of U.S. application Ser. No. 09/852,086 filed May 10, 2001 which is now U.S. Pat. No. 6,853,750, and is based upon and claims the benefit of priority from the prior Japanese Patent Application No. 2000-139253, filed on May 12, 2000, the entire contents of each of which are hereby incorporated herein by reference.

BACKGROUND OF THE INVENTION

1. Field of the Invention

The present invention relates to a video information processing apparatus for processing video information on the basis of identification information of a subject and a transmitter for transmitting identification information to the video information processing apparatus.

2. Description of the Related Art

In general, conventional video devices adopt a wireless transmission and reception method using infrared lights or the frequency band of GHz, and are widely applied to a television, videocassette recorder, radio LAN, and the like. A near field radio standard, Bluetooth, is also being established.

Digital cameras which record video data received by solid state image sensors such as CCDs in electronic memory devices instead of recording video by chemical reaction on photographic printing paper are also widely spread.

To photograph as a job or hobby, a large number of photographs make later rearrangement cumbersome. After days go by, the user can only confirm the contents of video by browsing the video itself. On the other hand, a method of adding a note to each subject when one video contains a plurality of subjects of interest has been proposed (Jpn. Pat. Appln. KOKAI Publication No. 6-343146). However, annotation is somewhat cumbersome.

A conventional monitor camera makes a person visually check camera video and determine the necessity of a rescue. A subject himself/herself cannot ask for a rescue without notifying another person of it. A victim who is threatened to be injured if he/she reports the crime cannot report the crime without notifying the attacker of it, though he/she is in front of the monitor camera.

A user inexperienced in capturing with a camera sometimes feels it difficult to make a plurality of subjects fall within a capturing range. In capturing, a person who does not want to be captured may exist in subjects unrelated to capturing. In this case, his/her privacy is violated.

It is an object of the present invention to provide a video information processing apparatus capable of easily realizing video rearrangement, and multiplexing information onto video to record the video.

It is another object of the present invention to provide a video information processing apparatus having a function of transferring the will of a subject without notifying people around him/her of it.

It is still another object of the present invention to provide a video information processing apparatus capable of easily confirming that a desired subject reliably falls within a capturing image.

BRIEF SUMMARY OF THE INVENTION

The present invention provides a video information processing apparatus comprising an input device which inputs video, a memory device which stores identification information corresponding to a blinking pattern of a blinking light source, a blinking light decoder which converts the identification information stored in the memory device into identification information corresponding to the blinking pattern of the light source blinking in the video input by the input device, and an output device which outputs together with the input video the identification information converted by the blinking light decoder.

When identification information is a URL, the video information processing apparatus can automatically create a "clickable image" which can display an Internet page corresponding to a subject by clicking the subject on a computer window. This eliminates a cumbersome operation of adding information to video, other than image capturing.

The present invention provides a video information processing apparatus comprising an input device which inputs video, a memory device which stores identification information corresponding to a blinking pattern of a blinking light source, a blinking light decoder which converts the identification information stored in the memory device into identification information corresponding to the blinking pattern of the light source blinking in the video input by the input device, and an output device which outputs together with the input video the identification information converted by the blinking light decoder.

If identification information sent by a subject represents that "the subject does not want to be captured", part or all of the frame is corrected, thereby protecting the privacy of the subject which does not want to be captured. The video information processing apparatus of the present invention can also cope with a case wherein a subject permits capturing and wants to receive his/her images later or a case wherein a subject wants accounting for his/her images.

The present invention provides a video information processing apparatus comprising an input device which inputs video, a memory device which stores identification information corresponding to a blinking pattern of a blinking light source, a blinking light decoder which converts the identification information stored in the memory device into identification information corresponding to the blinking pattern of the light source blinking in the video input by the input device, and a message output device which outputs a preset message in accordance with the identification information converted by the blinking light decoder.

When a subject which sends "emergency" identification information falls within the capturing range, a rescue agency or police is automatically notified of this. A crime prevention camera installed in an ATM (Automatic Teller Machine) of a bank, convenience store, or urban area reads emergency identification information and automatically notifies the rescue agency of the emergency identification information without notifying a subject (e.g., robber or molester) which threatens the transmission source of this.

The present invention provides a video information processing apparatus comprising an input device which inputs video, a memory device which stores identification information corresponding to a blinking pattern of a blinking light source, a blinking light decoder which converts the identification information stored in the memory device into identification information corresponding to the blinking pattern of the light source blinking in the video input by the input device, a location detector which detects a location of the blinking light source in the video, a subject memory device which stores identification information representing a subject to be detected, and a subject detector which detects a location of the subject having the identification information that is converted by the blinking light decoder and stored in the subject memory device, on the basis of the location of the blinking light source detected by the location detector.

Identification information sent by a subject to be captured (not to be captured) is registered in the video information processing apparatus of the present invention in advance. The camera senses whether the subject to be captured (not to be captured) falls within the capturing range, and if it falls outside (falls within) the capturing range, notifies the user of this. Alternatively, the camera automatically captures the subject when the subject to be captured (not to be captured) enters (exits from) the capturing range. Even a user inexperienced in capturing can easily capture a subject of interest within the frame.

The present invention also provides a transmitter which transmits identification information for each subject, for a video processing apparatus which processes video on the basis of identification information of a subject. The transmitter comprises a blinking pattern memory device which stores a blinking pattern representing identification information of a subject, and a light emitting device which emits the blinking pattern stored in the blinking pattern memory device at a predetermined timing. This transmitter can transmit identification information to the video processing apparatus.

BRIEF DESCRIPTION OF THE SEVERAL VIEWS OF THE DRAWING

FIG. 3 is a table showing an example of the blinking pattern dictionary of the video information processing apparatus according to the first embodiment;

FIG. 4 is a view showing an example of output information of the video information processing apparatus according to the first embodiment;

FIG. 5 is a block diagram showing the arrangement of a video information processing apparatus according to the second embodiment of the present invention;

FIG. 16 is a view showing an example of output information of the video information processing apparatus according to the fifth embodiment;

FIG. 17 is a view for explaining region setting of controlling the processing operation of the video information processing apparatus according to the fifth embodiment; and FIG. 18 is a block diagram showing the arrangement of a transmitter according to the sixth embodiment of the present invention.

DETAILED DESCRIPTION OF THE INVENTION

Embodiments of the present invention will be described below with reference to the several views of the accompanying drawing. A video information processing apparatus may be called a camera in the following description for convenience, but the video information processing apparatus of the present invention is not limited to one integrated with a video camera. For example, a camera may be connected to a personal computer, and the personal computer may perform calculation processing such as read of identification information. Alternatively, a camera may have a function of transmitting captured video to a remote place by radio or wire communication, and, e.g., a personal computer which receives video may perform calculation processing such as read of identification information.

Figure 1:
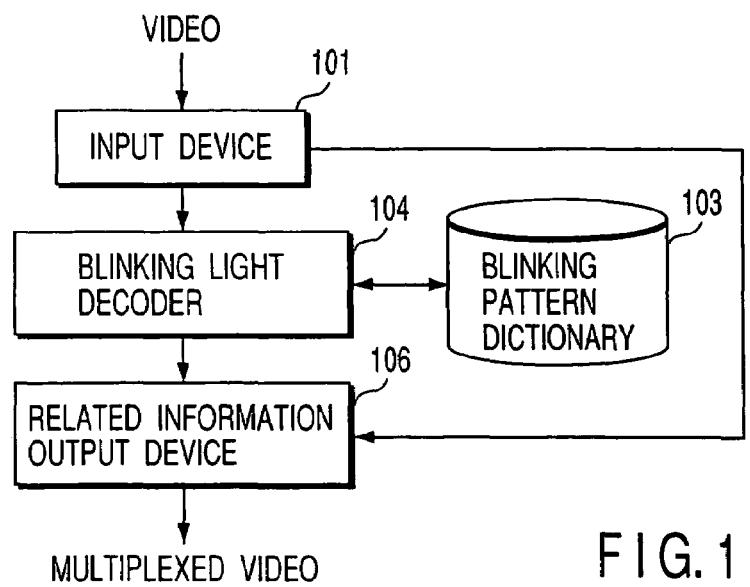
FIG. 1 is a block diagram showing the arrangement of a video information processing apparatus according to the first embodiment of the present invention.

FIG. 1 is a block diagram showing the arrangement of the first embodiment according to the present invention. Video information is input to an input device 101 such as a camera CCD, and separated into processing video and displaying/recording video. At this time, the processing video and displaying/recording video have the same contents.

Figure 2:
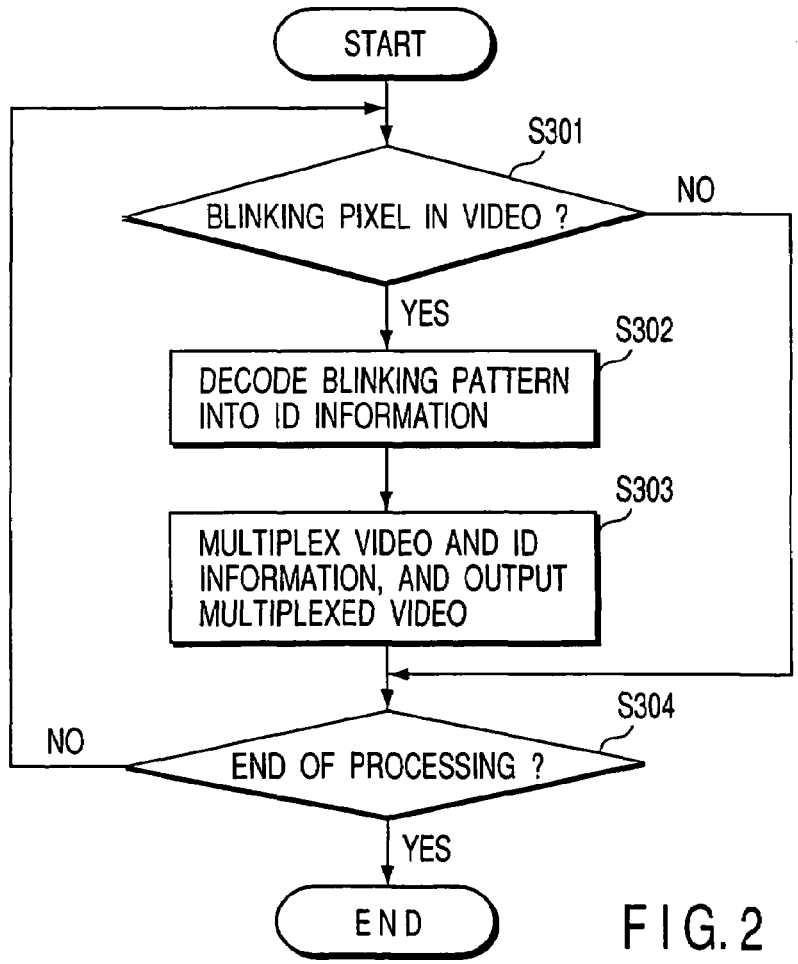
FIG. 2 is a flow chart showing the operation flow of the video information processing apparatus according to the first embodiment.

The processing video is sent to a blinking light decoder 104. As shown in the flow chart of FIG. 2, the blinking light decoder 104 determines based on video of several seconds whether a light source which blinks in accordance with a predetermined rule exists in video (S301).

The predetermined rule is an IrDA (Infrared Data Association) protocol for exchanging information by radio between infrared remote controllers for remote-controlling home appliances such as a television receiver, videotape player, and air conditioner, between notebook type personal computers, or between a notebook type personal computer and a printer. The rule may be another rule.

The present invention does not limit a method of identifying the presence/absence of blinks. An example of most easily finding blinks is to sum the luminance values of all pixels included in video and observe a change in the sum for several frames. For example, the sum of the luminance values of all the pixels of three frames from given time is 39321600, the sum of the luminance values of the next three frames is 39322112, and the sum of the luminance values of the next three frames returns to 39321600. In this case, if the camera angle is kept unchanged without any zooming or any moving object on a screen (e.g., a monitor camera in an unattended area), some of pixels on the screen are supposed to blink.

As another recognition method, a window (part of the screen) for searching for a blinking pixel may be limited, and blinking may be determined within this area by the same technique as described above. If a blinking pixel moves within the screen, the area itself may track the movement of the object. The tracking method in this case is generally a partial matching method using an optical flow for preceding and succeeding frames.

If a light source which blinks in accordance with the predetermined rule is found, the blinking light decoder 104 converts the blinking pattern into ID information (identification information) on the basis of a blinking pattern dictionary 103 (S302). FIG. 3 shows a storage example based on the blinking pattern dictionary. For example, lights-on and lights-off are respectively represented by 1 and 0. The blinking pattern of a light source that represents "10010110" means a numeral "150". A blinking pattern "0100100001100101011011000110110001101111" means a character string "Hello".

The converted ID information is sent to a related information output device 106 together with or separately from the displaying/recording video. The related information output device 106 multiplexes the ID information onto the displaying/recording video (S303). At this time, the video and identification signal are so multiplexed as to reconstruct the ID information in association with the video. If no video to be processed exists, the processing ends; if video to be processed exists, returns to processing in step S301 (S304).

Detection of a blinking pattern and multiplexing of ID information and video will be explained with reference to FIG. 4. In FIG. 4, video 201 captured by a camera includes two blinking light sources 202. As a result of decoding ID information from blinking patterns, it is found that one light source transmits ID information "(T) Kendall Station, Cambridge" and the other transmits ID information "Food Court, Open Hours 8 am–7 pm". In this case, the one-to-one correspondence between the light sources and ID information is not specified.

An example of multiplying ID information and video uses a sound. More specifically, the video 201 is recorded as motion video, and ID information 203 is recorded as a sound on a sound track. As another method, a video digital file includes the ID information 203. An area for recording additional information can be formed in a still video digital data format such as JPEG (Joint Photographic coding Experts Group) and a motion video digital data format such as MPEG (Moving Picture Experts Group). ID information may be recorded in this additional information area. Alternatively, video and ID information may be output as video and text files, respectively. The video output in association with the ID information can be exploited as follows.

For example, video of a captured historic spot at a sight-seeing place includes a light source blinking in accordance with the above-described predetermined rule, and the historic spot is commented by blinking. Another day, the user can display the comment of the historic spot recorded as ID information or listen to the comment by sound while watching the video. When a URL (Uniform Resource Locator: an alphanumeric string indicating the location of an information source on the Internet) indicating an information access point on the Internet is used as ID information, the user can obtain more detailed information via the Internet in browsing the captured video on a computer.

Captured video or ID information may not always be recorded or accumulated. In a wearable computer system which allows the user to always put on a small-size camera, if the camera receives ID information "milk is discounted 30% for 15 min from now" on a shop's signboard, this is provided to the user (person who carries the camera on him/her) by display or sound.

In this manner, video data on which ID information is multiplexed is output from the related information output device 106, and recorded on a recording medium (not shown) or transmitted to another processing apparatus (not shown).

FIG. 5 is a block diagram showing the arrangement of a video information processing apparatus according to the second embodiment of the present invention. An input device 401, blinking pattern dictionary 403, blinking light decoder 404, and related information output device 406 in FIG. 5 correspond to the input device 101, blinking pattern dictionary 103, blinking light decoder 104, and related information output device 106 in FIG. 1, respectively. In the video information processing apparatus of the second embodiment, a location detector 409 is added to the video information processing apparatus according to the first embodiment of the present invention.

Figure 6:
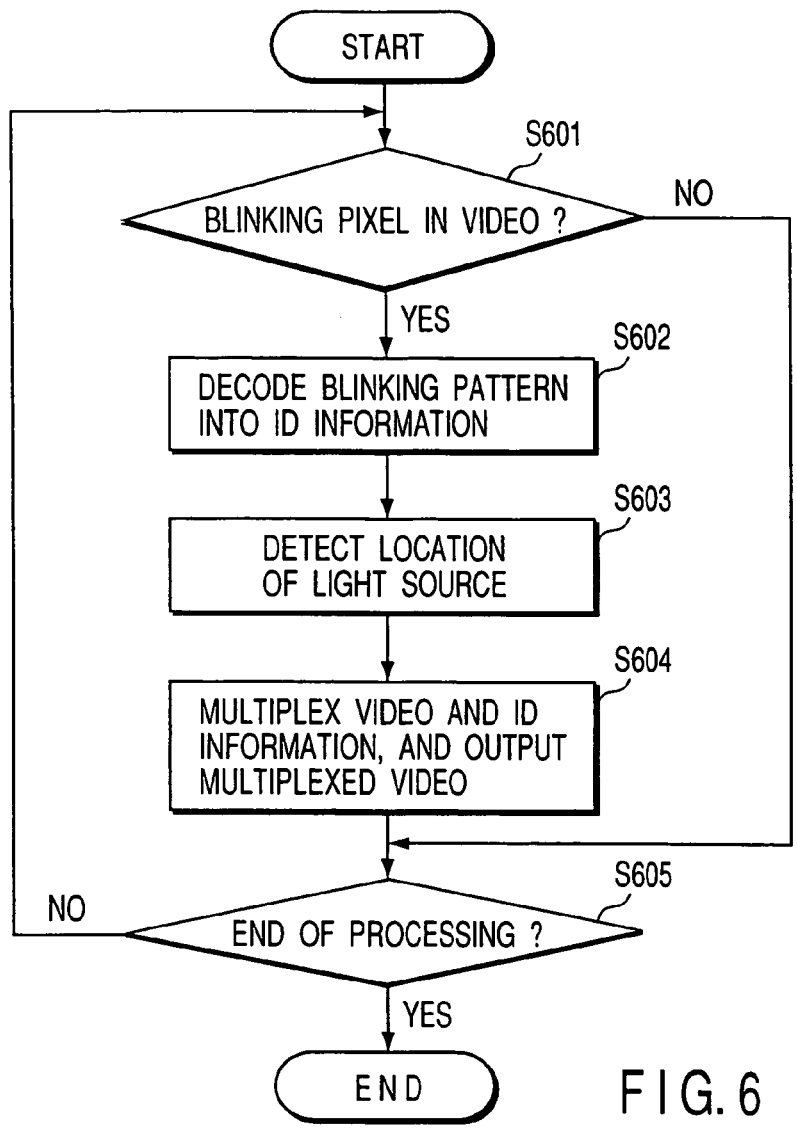
FIG. 6 is a flow chart showing the operation flow of the video information processing apparatus according to the second embodiment.

FIG. 6 is a flow chart showing the operation procedures of the video information processing apparatus according to the second embodiment. Video input from the input device 401 is separated into displaying/recording video, blinking inspecting video, and blinking location observing video. The three video images have the same contents. Similar to the first embodiment, the blinking light decoder 404 determines whether a light source which blinks in accordance with a predetermined rule exists in video (S601), and converts the blinking pattern into ID information on the basis of the blinking pattern dictionary 403 (S602).

The location detector 409 calculates a location in the video where the pixel transmits the blinking pattern converted into the ID information by the blinking light decoder 404 (S603), and sends the location information and the ID information converted from the blinking pattern to the related information output device 406. The related information output device 406 multiplexes the ID information with the location onto the video and outputs them, similar to the first embodiment (S604). If no video to be processed exists, the processing ends; if video to be processed exists, processing returns to step S601 (S605).

As described in the first embodiment of the present invention, the object tracking method using an optical flow is generally used as an example of a method of calculating the location of a blinking light source in video in step S603. However, the present invention does not limit the position calculation method to this.

Figure 7:
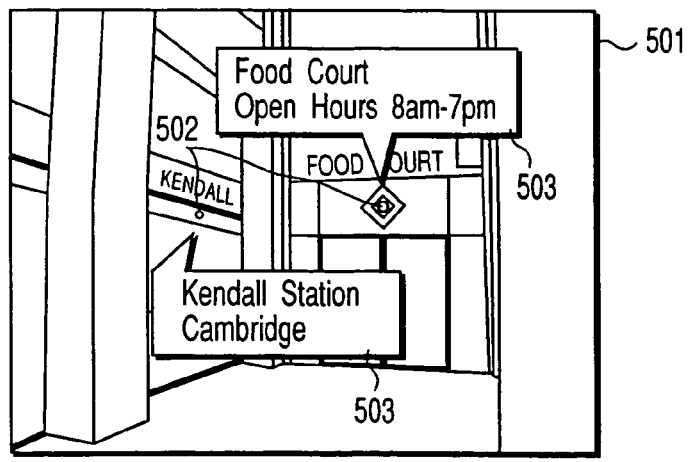
FIG. 7 is a view showing an example of output information of the video information processing apparatus according to the second embodiment.

FIG. 7 shows an application when a location is specified in the above way and ID information is multiplexed and recorded. Video 501 includes two blinking light sources 502. The blinking light source attached above the entrance blinks with a pattern "Food Court, Open Hours 8 am–7 pm", and the light source attached on the side wall surface blinks with a blinking pattern "Kendall Station, Cambridge".

These patterns include pieces of location information of the blinking light sources, so that the pieces of location information can be displayed as "balloons" 503 near the positions of the light sources 502. The use of such video realizes the following effects in addition to those of the first embodiment.

For example, video of a captured historic spot at a sight-seeing place includes a light source blinking in accordance with the above-described predetermined rule, and respective portions (temple, shrine, monument, plant, and the like) at the historic spot are commented by blinking. The user designates a subject of interest in playing back the video another day, and can display the comment of each portion at the historic spot recorded as ID information or listen to the comment by sound. When a URL indicating an information access point on the Internet is used as ID information, the user can obtain more detailed information via the Internet for each subject in browsing the captured video on a computer (clickable image).

Figure 8:
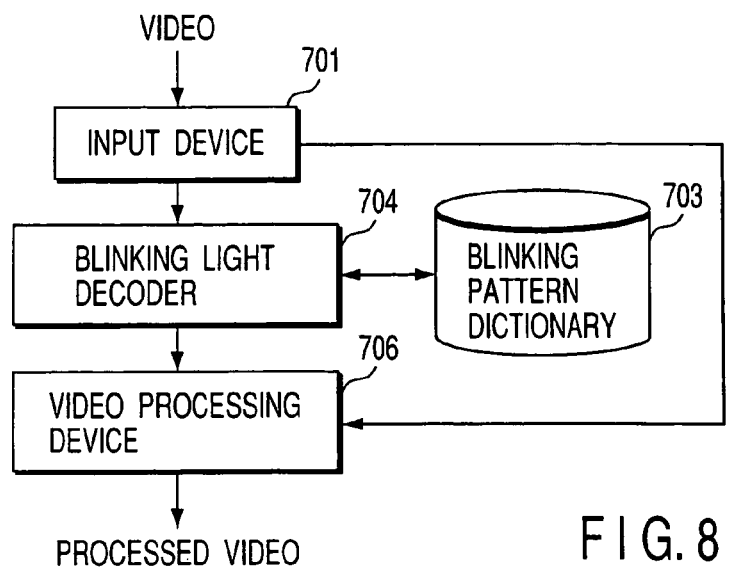
FIG. 8 is a block diagram showing the arrangement of a video information processing apparatus according to the third embodiment of the present invention.
Figure 9:
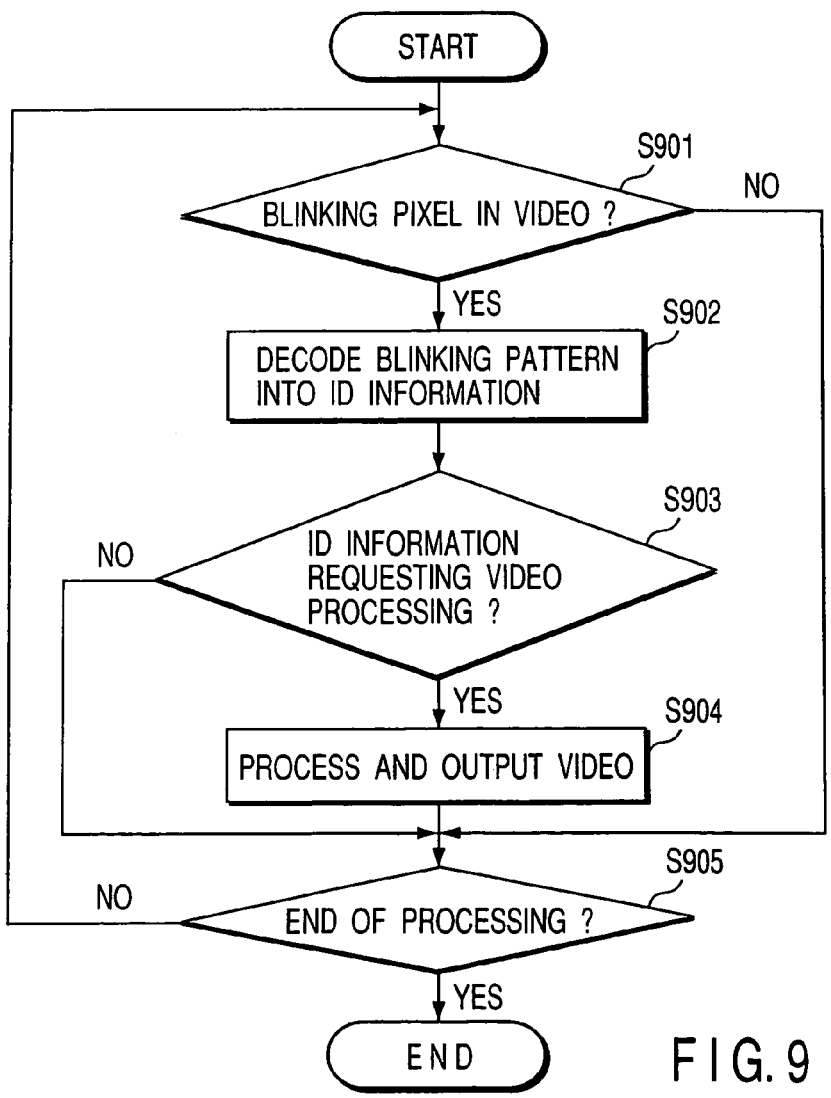
FIG. 9 is a flow chart showing the operation flow of the video information processing apparatus according to the third embodiment.

Captured video or ID information may not always be recorded or accumulated. In a wearable computer system which allows the user to always put on a glass-shaped display, if a camera receives ID information "milk is discounted 30% for 15 min from now" on a shop's signboard within the field of view of the camera, this is provided to the user such that he/she can immediately understand on the display the shop which discounts milk;

FIG. 8 is a block diagram showing the arrangement of a video information processing apparatus according to the third embodiment of the present invention. An input device 701, blinking pattern dictionary 703, and blinking light decoder 704 in FIG. 8 are identical to the input device 101, blinking pattern dictionary 103, and blinking light decoder 104 in FIG. 1, respectively. The third embodiment employs a video processing device 706 in place of the related information output device 106. FIG. 9 is a flow chart for explaining the third embodiment of the present invention.

Similar to the first embodiment, the blinking light decoder 704 determines whether a light source blinking in accordance with a predetermined rule exists in video input from the input device 701 (S901), and converts the blinking pattern into ID information on the basis of the blinking pattern dictionary 703 (S902).

If the ID information sent from the blinking light decoder 704 requests video processing (S903), the video processing device 706 processes the video and outputs the processed video (S904). If no video to be processed exists, the processing ends; if video to be processed exists, processing returns to step S901 (S905).

Figure 10:
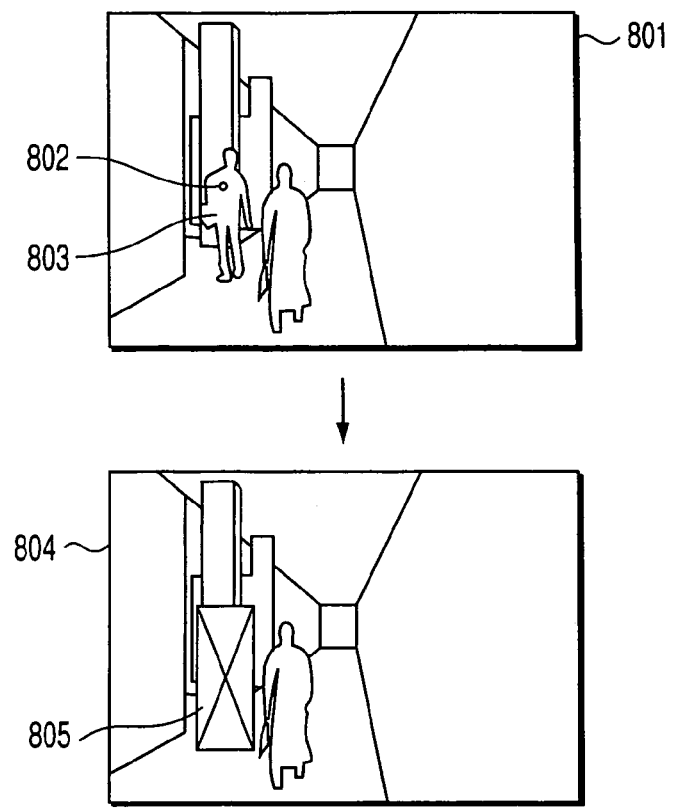
FIG. 10 is a view showing an example of output information of the video information processing apparatus according to the third embodiment.

FIG. 10 shows an application when a location is specified in the above way and ID information is multiplexed and recorded. For example, if a subject 803 in video 801 has a tag 802 which transmits ID information "don't take a picture of me", video processing device 706 smudges the "don't take a picture of me" portion, e.g., blacks the portion, or writes a character or sign representing "don't take a picture of me" in the video, and then outputs the processed video.

If the video information processing apparatus comprises a means for specifying a tag (blinking light source) which transmits given ID information in video, like the video information processing apparatus according to the second embodiment of the present invention, the video processing device 706 outputs video 804 obtained by blacking only the subject 803 which transmits the ID information "don't take a picture of me" or performing "blurring" or "mosaicking" (masked subject).

As a method of calculating the area of a tagged person from the location of the tag looked like a point in video, video is finely meshed (or divided in a plurality of video elements), a motion vector at each portion of the video (vector representing a position to which each portion of the mesh moves between the current and next frames) is calculated, and a portion having a motion vector different from that of the background is regarded as one subject area. As another method, an area is expanded from a tagged portion (part of a subject body), and an image up to a portion where the hue histogram or the like greatly changes is regarded as a subject. These methods are called object extraction techniques, and various methods are proposed. The present invention does not depend on a specific object extraction technique.

Instead of extracting an object, an area having a prescribed area may be automatically corrected to "20 pixels in radius around a tag".

Subject-transmitting ID information is not limited to "don't take a picture of me". For example, when a subject transmits the name, URL, or the like, the video processing device 706 may perform video processing of writing the name or URL near the tagged subject.

Figure 11:
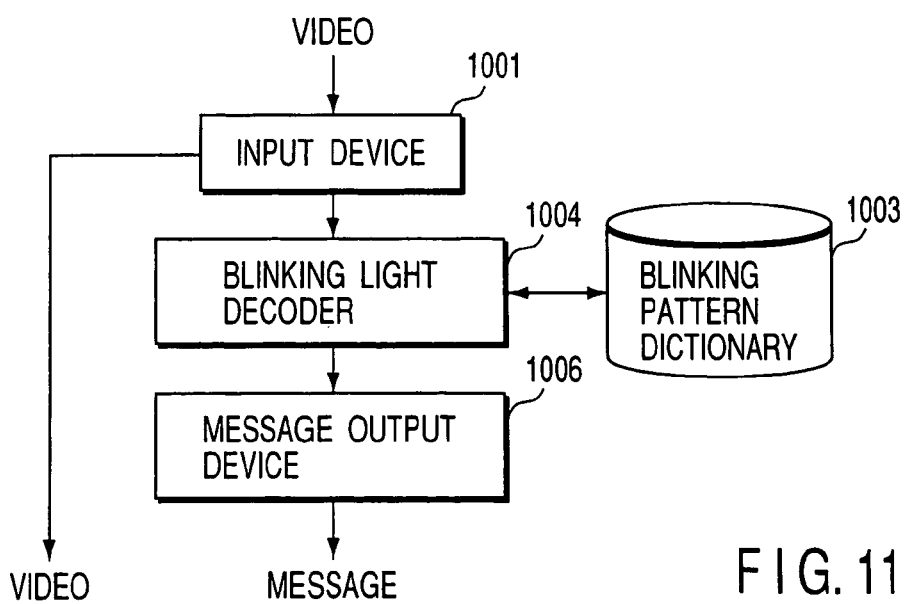
FIG. 11 is a block diagram showing the arrangement of a video information processing apparatus according to the fourth embodiment of the present invention.
Figure 12:
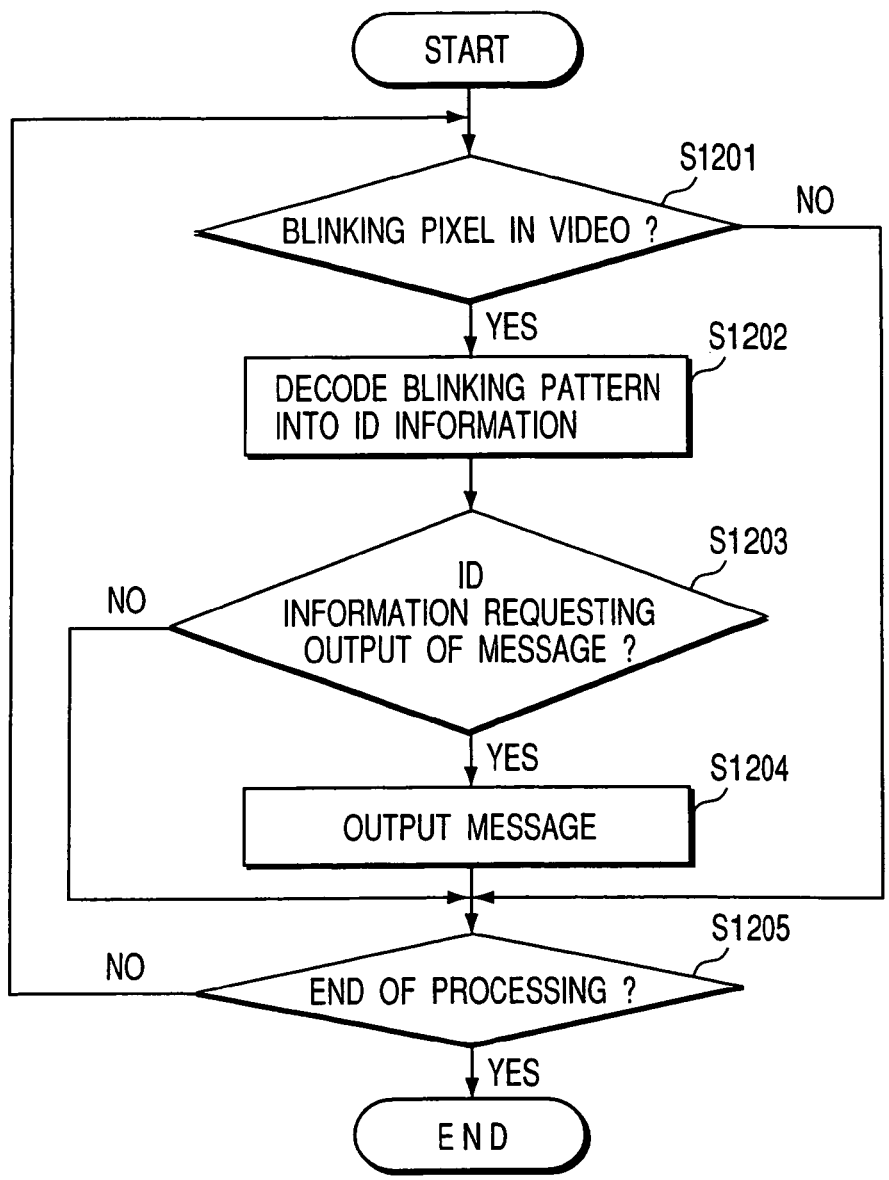
FIG. 12 is a flow chart showing the operation flow of the video information processing apparatus according to the fourth embodiment.

FIG. 11 is a block diagram showing the arrangement of a video information processing apparatus according to the fourth embodiment of the present invention. An input device 1001, blinking pattern dictionary 1003, and blinking light decoder 1004 in FIG. 11 correspond to the input device 101, blinking pattern dictionary 103, and blinking light decoder 104 in FIG. 1, respectively. The fourth embodiment exploits a message output device 1006 instead of the related information output device 106. FIG. 12 is a flow chart for explaining the procedures of the fourth embodiment of the present invention.

Assume that a camera attached to an ATM of a bank or a room where the ATM is installed is the input device 1001 of the present invention, and a subject which transmits an "emergency (rescue request)" enters the field of view of the camera. Similar to the first embodiment, the blinking light decoder 1004 determines whether a light source blinking in accordance with a predetermined rule exists in video input from the input device 1001 (S1201), and converts the blinking pattern into ID information on the basis of the blinking pattern dictionary 1003 (S1202).

If the ID information sent from the blinking light decoder 1004 requests the output of a message (Yes in S1203), the message output device 1006 outputs a message (S1204). If no video to be processed exists, the processing ends; if video to be processed exists, processing returns to step S1201 (S1205).

Figure 13:
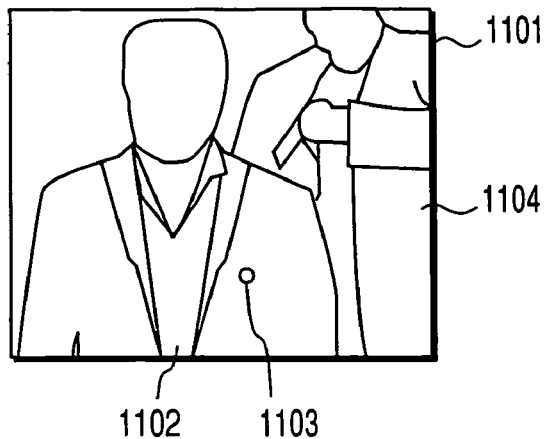
FIG. 13 is a view showing an example of output information of the video information processing apparatus according to the fourth embodiment.

FIG. 13 shows video representing this example. Video 1101 captured by a camera shows a person 1102 standing near an ATM, and, e.g., a robber 1104 who threatens the person 1102 exists behind the person 1102. Note that the robber 1104 need not fall within the video range captured by the camera.

The person 1102 wants to report that the person 1102 is threatened, without notifying the robber 1104 of this report in order to avoid any injury to the person 1102. For this purpose, the person 1102 sets a blinking light source (tag) 1103 put on him/her by operating a button switch to transmit an emergency signal.

This emergency signal is supplied by blinking an infrared LED, so the robber 1104 cannot visually recognize it. The person 1102 can express his/her will of asking for a rescue without notifying the robber 1104 of this.

The emergency signal emitted by the blinking light source 1103 is input as an ID signal to the input device 1001 of the present invention, and the emergency signal decoded by the blinking light decoder 1004 is sent to the message output device 1006. Upon reception of the emergency signal, the message output device 1006 transfers the message to a rescue agency. A transfer method to a rescue agency includes various methods using a telephone, the Internet, and a dedicated message line, and any method can be employed.

By transmitting the captured video in addition to the emergency signal, the rescue agency can grasp the situation of the site in more detail.

When a subject in video that transmits an emergency signal is sensed, as described in the second embodiment, the emergency signal is transmitted together with the video and location information to the rescue agency, which enables specifying the subject to be rescued without notifying a threatening subject (e.g., robber or molester) of this.

Applications of the present invention are not limited to emergencies. As for an ATM, if a handicapped person puts on him/her a tag which transmits ID information representing that he/she is handicapped, a bank staff can be notified that the customer who needs assistance comes to the ATM. At a public place such as a railroad station, when a handicapped person comes near to a thicket gate, the nearest ticket gate is automatically opened or a station attendant is notified of the need of assistance. According to the features of the present invention, in an environment where a monitor camera is installed, the monitor camera is replaced by the video information processing apparatus of the present invention so that transmitted ID information can be received without newly installing a radio receiver.

Figure 14:
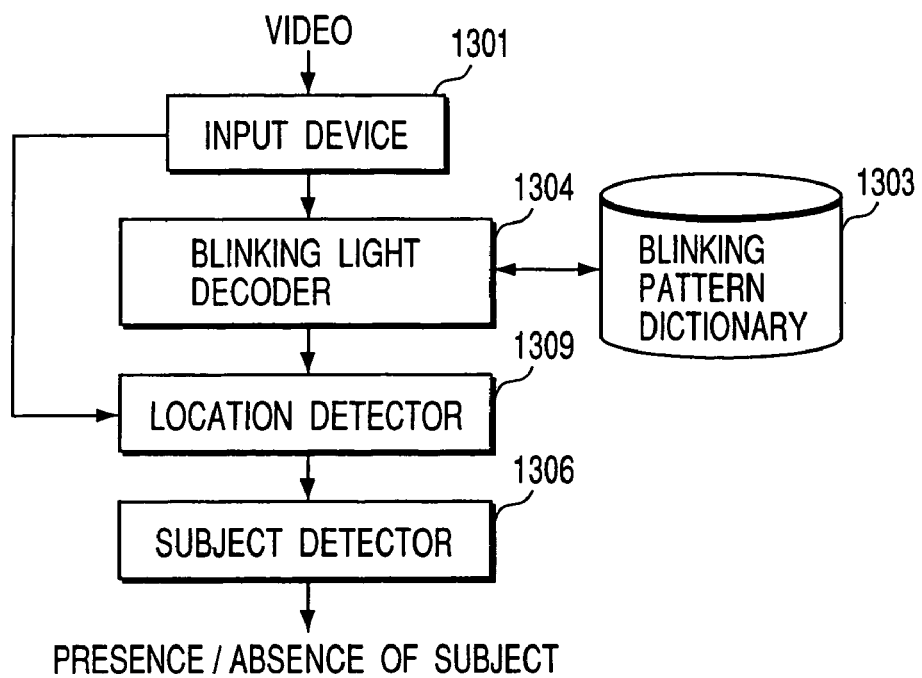
FIG. 14 is a block diagram showing the arrangement of a video information processing apparatus according to the fifth embodiment of the present invention.

FIG. 14 is a block diagram showing the arrangement of a video information processing method or apparatus according to the fifth embodiment of the present invention. An input device 1301, blinking pattern dictionary 1303, blinking light decoder 1304, and location detector 1309 in FIG. 14 correspond to the input device 401, blinking pattern dictionary 403, blinking light decoder 404, and location detector 409 in FIG. 5, respectively. The fifth embodiment adopts a subject detector 1306 instead of the related information output device 406.

Figure 15:
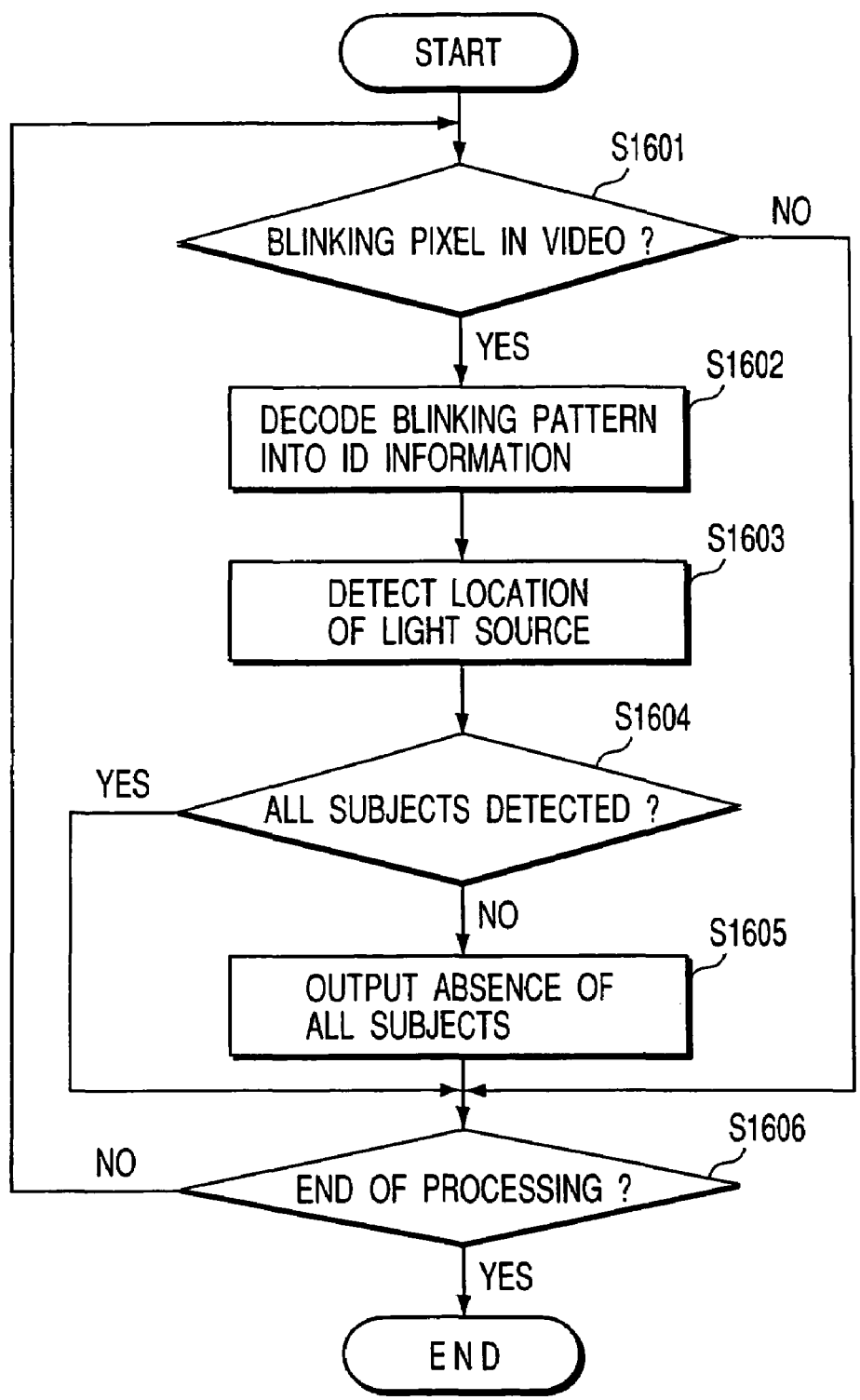
FIG. 15 is a flow chart showing the operation flow of the video information processing apparatus according to the fifth embodiment.

FIG. 15 is a flow chart for explaining the procedures of the fifth embodiment of the present invention. When a light source expected to exist within the capturing video range of a camera falls outside the capturing field of view, the user is notified of this.

Similar to the second embodiment, the blinking light decoder 1304 checks whether a light source blinking in accordance with a predetermined rule exists in video (S1601), and converts the blinking pattern into ID information on the basis of the blinking pattern dictionary 1303 (S1602).

The location detector 1309 calculates a location in the video where the pixel transmits the blinking pattern converted into the ID information by the blinking light decoder 1304 (S1603), and sends the location information and the ID information converted from the blinking pattern to the subject detector 1306. The subject detector 1306 determines whether ID information registered in advance has been read (S1604).

If No in step S1604, the subject detector outputs that all subjects fall outside the frame (S1605). If no video to be processed exists, the processing ends; if video to be processed exists, processing returns to step S1601 (S1606). Assume that four friends travel with a camera having the video information processing function of the present invention. The four friends act while putting on infrared ID tags (devices for transmitting unique ID information by infrared lights) serving as blinking light sources. The numbers of the four ID tags are known, and the four numbers are stored in the camera in advance. Processing in this case will be explained with reference to FIG. 16.

FIG. 16 shows persons 1402, 1404, 1406, and 1408 as subjects. They put on infrared ID tags 1403, 1405, 1407, and 1409, respectively. The subject detector 1306 stores the four numbers as subjects.

In capturing the persons, whether the four tags fall within the capturing field of view is checked prior to capturing. In FIG. 16, only the tags "1403", "1405", and "1407" are received as a result of decoding pieces of blinking information within a capturing area 1401 by the blinking light decoder 1304. In this example, the positions of the infrared tags in the video need not be specified, and the location detector 1309 outputs only the pieces of decoded ID information, i.e., the three numbers as ID information. An example using the location will be described later.

The subject detector 1306 compares the three numbers with the prestored four numbers, and detects that only the three numbers have been received in the capturing area 1401. The video information processing apparatus of the present invention notifies the user that not all the persons fall within the capturing field of view, by using a warning display in the viewfinder of the camera, a warning message such as a warning sound or voice, or a vibrator. This makes it easy for the user to always capture the three friends.

In the above description, the video information processing apparatus of the present invention determines only the presence/absence of a light source predicted to exist within the video range. By defining a warning area in the capturing field of view, a similar warning display or voice can be provided when a light source exists within the warning area. In FIG. 17, an outer solid frame 1501 represents a capturing area, and an area between the solid frame 1501 and a dotted frame 1502 is set as a warning area.

If, for example, a light source exists in the warning area, the video information processing apparatus can output a warning message "the subject having this light source may fall outside the frame in capturing". This method can be conversely used to provide a display or voice representing that the four friends fall within the capturing field of view and notify the user that preparations are made for the purpose (of capturing all the four friends).

Letting B be the warning area and A be the video area (inside the dotted frame 1502) of the remaining capturing field of view, the user can be warned that a light source moves from area A to area B, and can be notified that a light source enters area B from an area outside the capturing field of view.

As a modification, it is also possible to check whether a predetermined number of light sources fall within the capturing field of view and when a light source emitting predetermined ID information falls within the capturing field of view, automatically perform capturing.

To the contrary, it is also possible to check whether a predetermined light source falls within the capturing field of view and when a light source emitting ID information designated in advance falls outside the capturing field of view, automatically perform capturing. A reason of performing capturing when registered ID information falls outside the capturing field of view is that a person who does not want to be captured may exist in the party. If one person does not want to be captured, no capturing is done while the person exists in the field of view.

The camera itself may comprise a driving unit capable of voluntarily changing the location, direction, and capturing range. In this case, if a predetermined light source falls or is going to fall outside the capturing field of view, the camera instructs the driving unit to make the light source fall within the capturing field of view and adjusts the prospective light source so as to fall within the capturing field of view.

Assume that the user travels with three friends, as described in the fifth embodiment, and is to capture all the four people by using a self-timer. At this time, if predetermined light sources (four light sources of the four people) fall outside the capturing field of view, the camera adjusts the lens to the telephoto side so as to make a wider range fall within the capturing field of view, or drives the capturing direction in the top-to-bottom and right-to-left directions so as to make all the four light sources fall within the capturing field of view. Accordingly, even capturing using a self-timer can be achieved without any failure.

The optical system may be automatically adjusted by physically changing the lens position or direction. Alternatively, the apparatus may hold a large video range as a capturing candidate range in advance, and a capturing target range may be selected in capturing so as to include an expected light source. The user may be prompted to capture after the capturing field of view is adjusted, or the apparatus may automatically capture.

To the contrary, the camera can be adjusted not to include a predetermined light source within the capturing range.

When the camera is fixed, the user can discriminate between a background and an object in view of an image level. In other words, it can be recognized that a portion corresponding to a difference between an image including a person and an image including no person is a moved person. The shape of a moved person is obtained by using the object portion including a blinking light source as a mask.

If the present invention is applied to a personal computer having a camera function, the personal computer can be locked when a person except for a registered person approaches the personal computer.

When the person putting a blinking light source moves in a video frame, the camera can trace the moving person.

FIG. 18 is a block diagram showing an arrangement of a transmitter serving as a blinking light source. This transmitter comprises a blinking pattern memory device 180 which stores a blinking pattern corresponding to ID information, a timing generator 182 for generating an emission timing in accordance with a pattern stored in the blinking pattern memory device, and a light emitting device 184 for emitting light with the blinking pattern on the basis of a timing generated by the timing generator.

The transmitter can adopt an arbitrary form. For example, the transmitter may be attached to a shop or the information board of a historic spot or may be attached like a badge to a person.

Processing in each embodiment of the video information processing apparatus according to the present invention can be implemented by a program executable by a computer, and this program can be implemented as a computer-readable storage medium.

The storage medium in the present invention is not limited in storage format as far as the storage medium such as a magnetic disk, floppy disk, hard disk, optical disk (CD-ROM, CD-R, DVD, or the like), magnetooptical disk (MO or the like), or semiconductor memory can store the program and is readable by a computer.

Some of processes for implementing each embodiment may be executed by an OS (Operating System) running on a computer or MW (MiddleWare) such as database management software or network on the basis of an instruction from a program installed in a computer from a storage medium.

The storage medium in the present invention includes not only a medium independent of a computer, but also a storage medium which stores or temporarily stores a program transmitted and downloaded from a LAN, the Internet, or the like.

The storage medium is not limited to one, and includes a plurality of media from which processing in each embodiment is executed. The medium can adopt any arrangement.

The computer in the present invention executes each processing in each embodiment on the basis of a program stored in a storage medium, and may be one apparatus such as a personal computer or a system in which a plurality of apparatuses are connected via a network.

The computer in the present invention is not limited to a personal computer, and includes an arithmetic processing apparatus or microcomputer included in an information processor. Devices and apparatuses capable of realizing the functions of the present invention by programs are generally named computers.

The video information processing apparatus or transmitter of the present invention is not limited to the above-described embodiments. The present invention can be variously modified within the spirit and scope of the invention.

As has been described above, the video information processing method or apparatus of the present invention can read tag-emitting ID information by video processing and variously process the video.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video information processing apparatus associated with a blinking light source, comprising:
    an input device configured to input video information;
    a memory device configured to store identification information corresponding to a blinking pattern of the blinking light source;
    a blinking light decoder configured to convert the blinking pattern of the blinking light source, blinking in the video information input by said input device, into corresponding identification information on the basis of the identification information stored in said memory device, the blinking light decoder including a recognizing device configured to recognize blinking of the blinking light source by summing luminance values of all pixels included in several frames of the video information of the input device and detecting a change in sum every several frames; and
    an output device configured to output together with the input video the identification information converted by said blinking light decoder.

2. An apparatus according to claim 1, wherein said output device multiplexes the identification information and the video information while associating the identification information with the video information, and outputs the multiplexed video.

3. An apparatus according to claim 2, wherein said output device includes a converter configured to convert identification information into a sound, and a multiplexer configured to multiplex the sound and video.

4. An apparatus according to claim 1, wherein said output device represents the identification information with a character string indicating an information access point on the Internet.

5. A transmitter used in said video information processing apparatus defined in claim 1, comprising:

a blinking pattern memory device configured to store a blinking pattern representing identification information of a subject; and a blinking light source configured to blink and emit light in accordance with the blinking pattern stored in said blinking pattern memory device.

6. A video information processing apparatus associated with a blinking light source, comprising:

an input device configured to input video information;

a memory device configured to store identification information corresponding to a blinking pattern of the blinking light source;

a blinking light decoder configured to convert the blinking pattern of the blinking light source, blinking in the video information input by said input device, into corresponding identification information on the basis of the identification information stored in said memory device, the blinking light decoder including a recognizing device configured to recognize blinking of the blinking light source by summing luminance values of all pixels included in several frames of the video information of the input device and detecting a change in sum every several frames;

a location detector configured to detect a location of the blinking light source in the video information; and an output device configured to output together with the input video the identification information converted by said blinking light decoder and the location of the blinking light source detected by said location detector.

7. An apparatus according to claim 6, wherein when the blinking pattern includes explanation information for explaining an object included in the video information, said output device includes at least one of a display device configured to display the explanation information and an audio device configured to output the explanation information by a sound.

8. An apparatus according to claim 6, wherein said output device multiplexes the identification information and the video information while associating the identification information with the video information, and outputs the multiplexed video.

9. An apparatus according to claim 8, wherein said output device includes a converter configured to convert the identification information into a sound and a multiplexer configured to multiplex the sound and the video information.

10. An apparatus according to claim 6, wherein said output device represents the identification information by a character string indicating an information access point on the Internet.

11. A transmitter used for said video information processing apparatus defined in claim 6, comprising:

a blinking pattern memory device configured to store a blinking pattern representing identification information of a subject; and a blinking light source configured to blink and emit light in accordance with the blinking pattern stored in said blinking pattern memory device.

12. A video information processing apparatus associated with a blinking light source, comprising:

an input device configured to input video information;

a memory device configured to store identification information corresponding to a blinking pattern of the blinking light source;

a blinking light decoder configured to convert the blinking pattern of the blinking light source, blinking in the video information input by said input device, into corresponding identification information on the basis of the identification information stored in said memory device, the blinking light decoder including a recognizing device configured to recognize blinking of the blinking light source by summing luminance values of all pixels included in several frames of the video information of the input device and detecting a change in sum every several frames; and a video processing device configured to selectively process the input video in accordance with the identification information converted by said blinking light decoder.

13. An apparatus according to claim 12, wherein said processing device masks a video portion specified by the identification information.

14. An apparatus according to claim 13, wherein when the identification information requests no capturing, said processing device smudges the specified video portion.

15. A transmitter used for said video information processing apparatus defined in claim 12, comprising:

a blinking pattern memory device configured to store a blinking pattern representing identification information of a subject; and a blinking light source configured to blink and emit light in accordance with the blinking pattern stored in said blinking pattern memory device.

16. A video information processing apparatus associated with a blinking light source, comprising:

an input device configured to input a video;

a memory device configured to store identification information corresponding to a blinking pattern of the blinking light source;

a blinking light decoder configured to convert the blinking pattern of the blinking light source, blinking in the video information input by said input device, into corresponding identification information on the basis of the identification information stored in said memory device, the blinking light decoder including a recognizing device configured to recognize blinking of the blinking light source by summing luminance values of all pixels included in several frames of the video information of the input device and detecting a change in sum every several frames; and a message output device configured to output a preset message in accordance with the identification information converted by said blinking light decoder.

17. A transmitter used for said video information processing apparatus defined in claim 16, comprising:

a blinking pattern memory device configured to store a blinking pattern representing identification information of a subject; and a blinking light source configured to blink and emit light in accordance with the blinking pattern stored in said blinking pattern memory device.

18. A video information processing apparatus associated with a blinking light source, comprising:
- an input device configured to input video information;
- a memory device configured to store identification information corresponding to a blinking pattern of the blinking light source;
- a blinking light decoder configured to convert the blinking pattern of the blinking light source, blinking in the video information input by said input device, into corresponding identification information on the basis of the identification information stored in said memory device, the blinking light decoder including a recognizing device configured to recognize blinking of the blinking light source by summing luminance values of all pixels included in several frames of the video information of the input device and detecting a change in sum every several frames;
- a location detector configured to detect a location of the blinking light source in the video information;
- a subject memory device configured to store identification information representing a subject to be detected; and
- a subject detection device configured to detect a location of the subject having the identification information that is converted by said blinking light decoder and stored in said subject memory device, on the basis of the location of the blinking light source detected by said location detector.

19. An apparatus according to claim 18, wherein said subject detection device detects a plurality of subjects on the basis of a plurality of pieces of identification information corresponding to a plurality of blinking light sources.

20. An apparatus according to claim 19, wherein said subject detection device includes an output device configured to output a warning when all the subjects corresponding to the plurality of pieces of identification information in the video information cannot be detected.

21. A transmitter used for said video information processing apparatus defined in claim 18, comprising:
- a blinking pattern memory device configured to store a blinking pattern representing identification information of a subject; and
- a blinking light source configured to blink and emit light in accordance with the blinking pattern stored in said blinking pattern memory device.

* * * * *